United States Patent

[11] 3,571,732

[72] Inventor Jack T. Richardson
Seattle, Wash.

[21] Appl. No. 742,450
[22] Filed July 3, 1968
[45] Patented Mar. 23, 1971
[73] Assignee The United States of America as represented by the Secretary of the Air Force

[54] VOLTAGE CONTROLLED PHASE SHIFTER
1 Claim, 13 Drawing Figs.

[52] U.S. Cl. .......... 328/155,
307/218, 307/262, 307/273, 328/127, 328/20
[51] Int. Cl. .......... H03b 3/04
[50] Field of Search .......... 307/265,
262, 273, 234; 328/133, 112, 155, 127, 20

[56] References Cited

UNITED STATES PATENTS

| | | | |
|---|---|---|---|
| 3,195,056 | 7/1965 | Trautwein | 307/273X |
| 3,237,188 | 2/1966 | Shair et al. | 307/273X |
| 3,333,205 | 7/1967 | Featherston | 307/273X |
| 3,383,546 | 5/1968 | Chopey | 307/273X |
| 3,413,412 | 11/1968 | Townsend | 307/234X |
| 3,426,218 | 2/1969 | Baynard | 307/265 |
| 3,436,682 | 4/1969 | Birnbaum | 307/265X |

*Primary Examiner*—John S. Heyman
*Attorneys*—Harry A. Herbert, Jr. and Irving Levin

ABSTRACT: A circuit to vary the phase of a square wave clock as a function of a DC input voltage by dividing and differentiating the clock input signal to produce positive and negative pulses, gating these pulses to trigger two monostable multivibrators, the pulse widths of which are functions of the DC input voltage. The multivibrator outputs are differentiated, combined, and the frequency is doubled to obtain the phase shifted signal.

INVENTOR
JACK T. RICHARDSON
BY Harry A. Herbert Jr
ATTORNEYS

INVENTOR
JACK T. RICHARDSON
BY Harry A. Herbert Jr
ATTORNEYS

INVENTOR
JACK T. RICHARDSON
BY Harry A. Herbert Jr
ATTORNEYS

VOLTAGE CONTROLLED PHASE SHIFTER

BACKGROUND OF THE INVENTION

The present invention pertains to a circuit for varying the phase of a square wave clock input signal by controlling a DC input voltage to a specific point in the circuit.

In certain systems it is frequently necessary to provide electrical pulses of a phase determined by a time varying potential. That is, the electrical pulses must be synchronized so as to have particular magnitude at certain instants of time. Electrical circuit for synchronizing electrical oscillators have been provided heretofore. However, in the usual prior art systems, effective synchronization is achieved with a greater number of components or with components of relatively precise value. In either event, such systems entail a larger cost than is necessary for certain systems. The invention herein described requires only a minimum of components, none of which need be expensive or highly critical in performance.

SUMMARY OF THE INVENTION

In the phase shifter of the present invention, means are provided for dividing an input clock input signal, differentiating the resulting signal into negative and positive pulses and gating the respective negative and positive pulses to appropriate monostable multivibrators. The multivibrators provide pulse trains whose timing characteristic is determined both by external synchronizing signals applied thereto and by internal circuit parameters, which in this instance are determined by a direct current voltage presented at a control input. The outputs of the two monostable multivibrators are differentiated, and recombined so that the frequency is multiplied to obtain the resultant phase shifted signal.

It is accordingly an object of this invention to effect phase shifting of a clock signal with simple and inexpensive circuit components.

A further object of this invention is the provision of a variable phase shifter for use with a square wave input having a very wide range of phase variation.

BRIEF DESCRIPTION OF THE DRAWINGS

The features of the invention are better understood from the following description of the preferred embodiment taken in conjunction with the accompanying drawings in which.

DESCRIPTION OF THE PREFERRED EMBODIMENT

Figure 1:
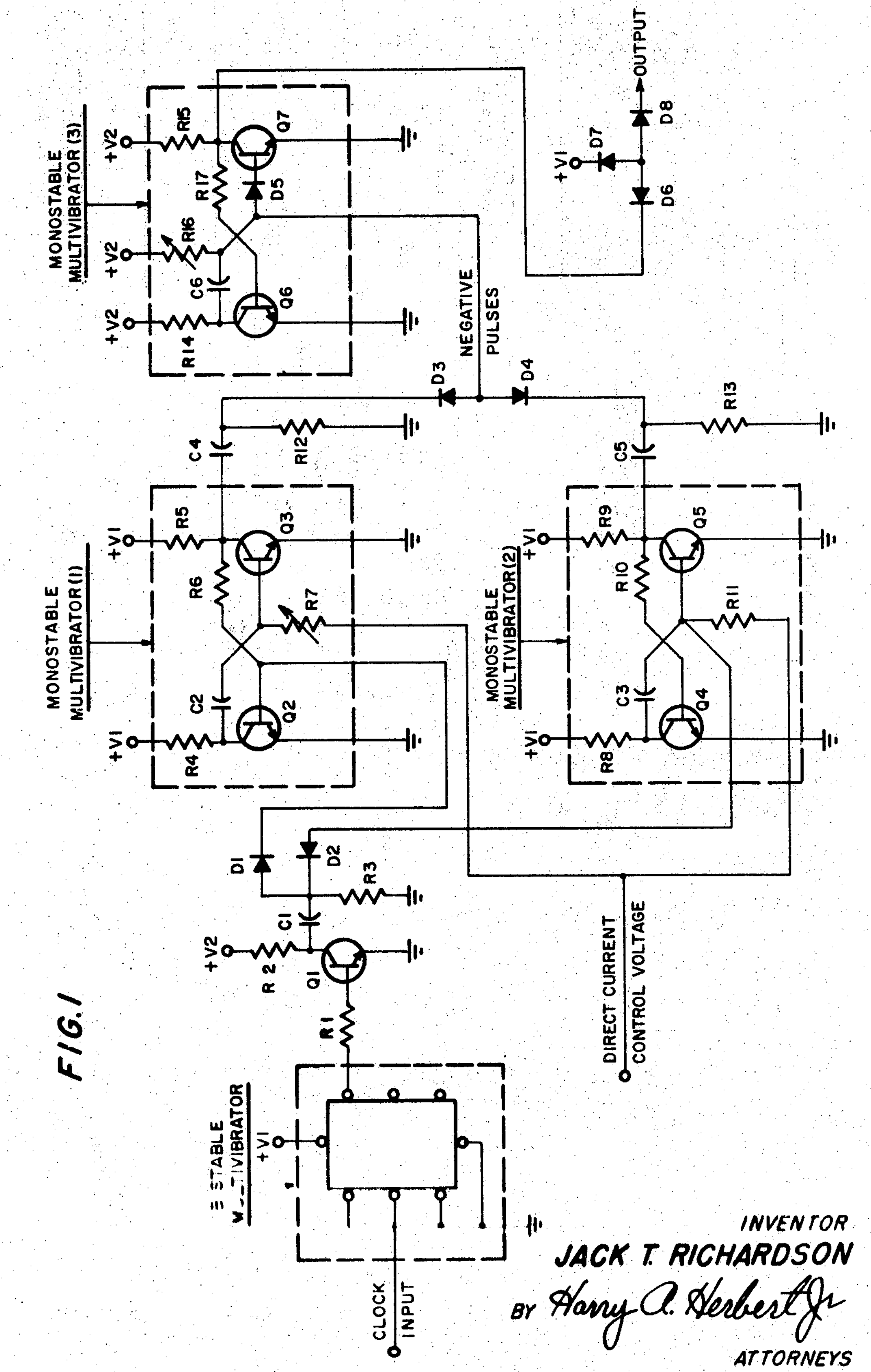
FIG. 1 is a schematic representation of a voltage controlled phase shifter incorporating this invention.
Figures 2A, 2B, 2C, 2D, 2E, 2F, 2G, 2H, 2I, 2J, 2K:
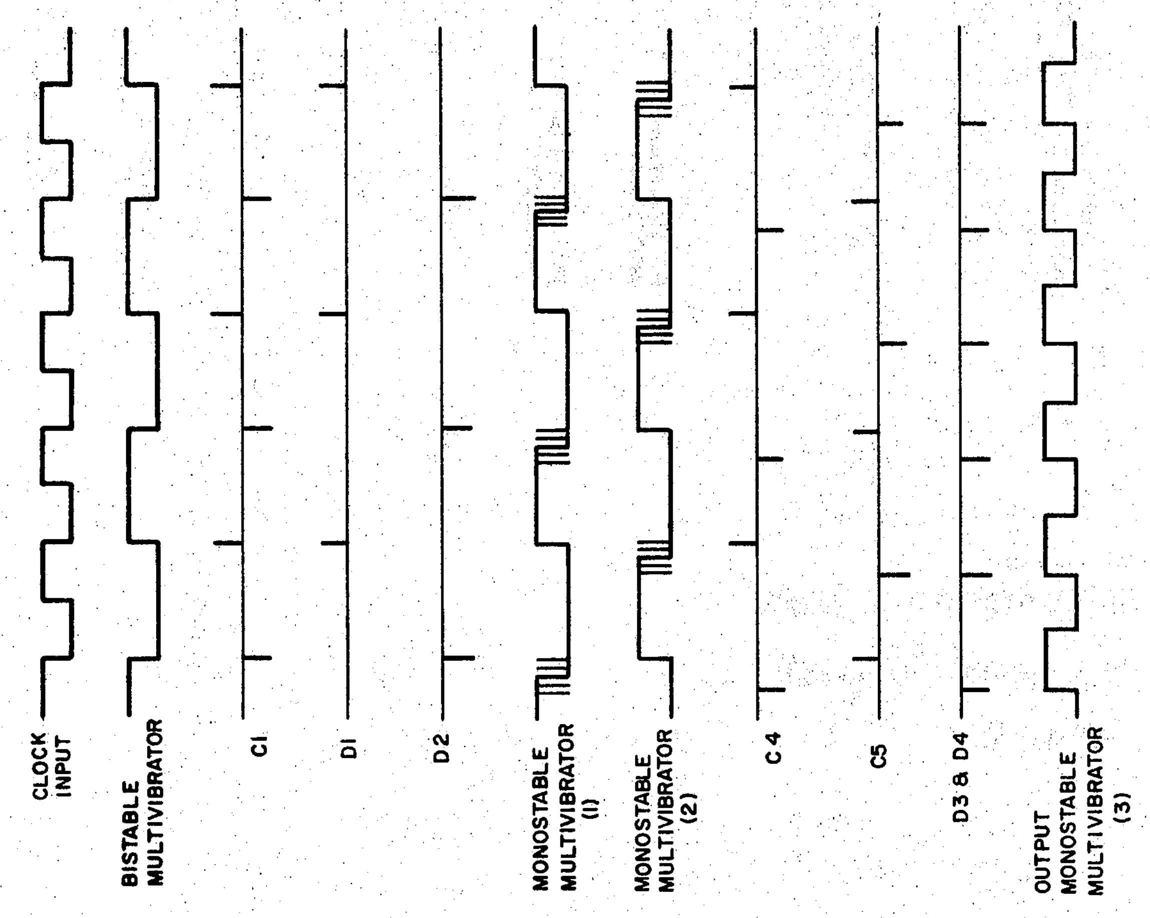
FIGS. 2*a*—2*k* are graphical representations of waveforms at various points of the phase shifter of FIG. 1.

Referring now to FIG. 1, a square wave clock signal as shown in FIG. 2*a* arrives at the clock input to the triggered bistable multivibrator where the clock signal is divided by two as shown in FIG. 2*b*. The bistable multivibrator is characterized mainly by its ability to maintain either of two possible states and a description of its operation may be found in Transistor Circuit Design published in 1963 by the Engineering Staff of Texas Instruments, Incorporated, pages 373—377.

The bistable multivibrator may be conveniently constructed by connecting a J–K flip-flop integrated circuit as shown in FIG. 1, although other circuits made from discrete components may also be used if desired. The resulting half-frequency signal square wave is amplified by an amplification stage which comprises transistor Q1 and resistor R1 and R2. The resultant amplified signal is differentiated by capacitor C1 and resistor R3 in order to produce positive and negative spikes at the leading and trailing edges of the square wave as shown in FIG. 2*c*. Diode D1, as shown in FIG. 2*d*, gates the positive pulses to trigger monostable multivibrator 1 into its unstable state. This multivibrator consists of transistors Q2 and Q3, resistors R4, R5, R6 and R7, and capacitor C2. Diode D2, as shown in FIG. 2*e*, gates the negative pulses to trigger monostable multivibrator 2 into its unstable state. This multivibrator consists of transistors Q4 and Q5, resistors R8, R9, R10 and R11 and capacitor C3. The time during which the two monostable multivibrators 1 and 2 remain in their unstable states is determined by the times required to discharge capacitors C2 and C3. The respective discharge paths are returned to a source variable potential, the potential of which determines the discharge time of the capacitors and hence, the time the circuits remain in their unstable states. Resistor R7 is made adjustable to equalize the times required for capacitors C2 and C3 to discharge.

It will be noted that the square wave produced by the bistable multivibrator is in phase with the clock input, but is of half the frequency. When differentiated, its output is a negative spike corresponding to the end of a positive-going pulse and a positive spike at a time corresponding to the end of the omitted positive pulse of the clock input. These positive and negative spikes are separated and impressed on the two monostable multivibrators. Thus one of the monostable multivibrators in triggered from its stable to its unstable state at the end of a positive-going pulse of the clock input, but each operates at half the frequency of the clock input.

The differentiated output of each of the monostable multivibrators 1 and 2 includes a negative spike when the multivibrators shift from an unstable state to a stable state. These spikes are delayed behind corresponding trigger pulses by a time interval determined by the control voltage. If the control voltage is such that the outputs of the monostable multivibrators 1 and 2 are symmetrical (equal stable and unstable times), there will be a negative spike at a time corresponding to the end of a positive pulse in the clock input. However, the relative phase of the negative spikes relative to the clock input is variable by means of the control voltage. The repetition rate of the negative spikes remains essentially fixed by the clock input.

The repetition rate of the negative pulses from each monostable multivibrator 1 or 2 is equal to that of the bistable multivibrator. The sum of the negative spikes is thus equal to the repetition rate of the clock input. These negative pulses are separated by diodes D3 and D4 and used to trigger monostable multivibrator 3 comprising transistors Q6 and Q7 and charge-discharge circuit R16, C6 and D5. The unstable time of multivibrator 3 is adjusted to equal the positive pulse length of the clock input wave. Its output is thus a symmetrical square wave having the frequency of the clock input. Thus, the output signal from diodes D1 and D2 determines the time that the monostable multivibrators are triggered ON and the signal from the control input determines the length of time that the monostable multivibrators stay ON or, in effect, the pulse width of the multivibrators. This can be seen in FIGS. 2*f* and 2*g* wherein monostable multivibrator 1 is triggered ON upon application of a positive signal to the base electrode of transistor Q1 via diode D1, and turn OFF time can be varied according to the signal received at the base electrode of transistor Q3 from the control input and is depicted in FIG. 2*f*. Similarly, monostable multivibrator 2 is triggered ON upon application of a negative signal to the base electrode of transistor Q5 via diode D2, and turn OFF time can be varied according to the signal received at the base electrode of transistor Q5 from the control input and is depicted in FIG. 2*g*. Resistor R7 is variable to adjust the pulse width tracking between monostable multivibrators 1 and 2.

The outputs of the monostable multivibrators are differentiated by RC networks C4, R12 and C5, R13, as shown in FIGS. 2*h* and 2*i*. The resulting negative pulses are combined by an OR gate consisting of diodes D3 and D4 as shown in FIG. 2*j*. The resulting phase relationship of the pulse train to the incoming clock thus depends directly on the voltage applied to the control input. The pulse train is then used to trigger another monostable multivibrator consisting of transistors Q6 and Q7, resistors R14, R15, R16, and R17, and capacitor C6. This monostable multivibrator serves as a frequency doubler which converts the phase shifted pulse train into a square wave of the same frequency as the incoming clock. Resistor R16 is variable to adjust the output waveform duty cycle to produce a square wave. Thus, the output square wave, as shown in FIG. 2*k*, is shifted in phase from the input in direct proportion to the control voltage. Diodes D6, D7 and D8 are used to provide isolation and clamping to insure a square wave output.

The voltage supplied at the control input must be approximately the value of V1 for proper operation. However, this voltage may be modified to any practical value by judicious modification of the monostable multivibrator design.

Figure 3:
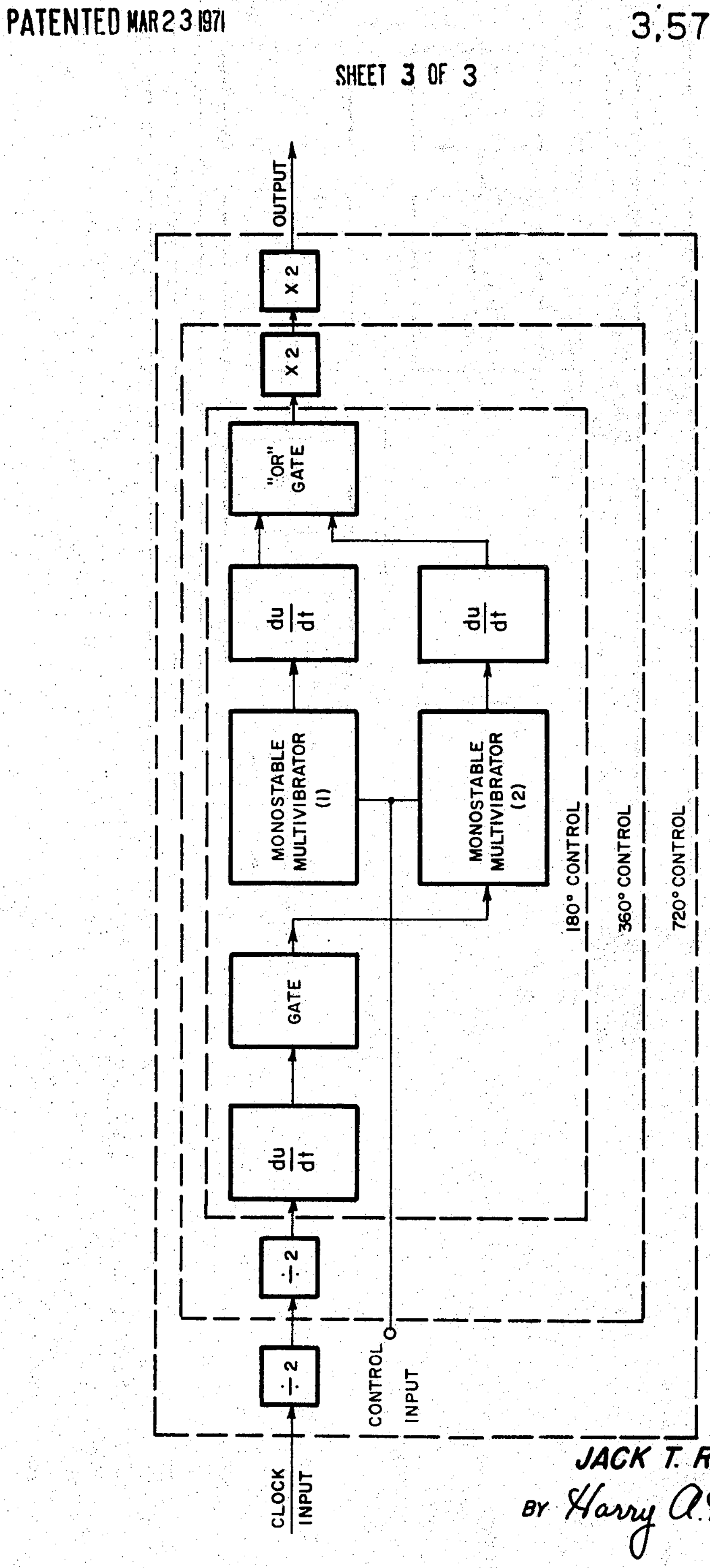
FIG. 3 is a block diagram of the voltage controlled phase shifter of the present invention showing an expanded control range.

The phase control range for the circuit shown in FIG. 1 is slightly greater than 360°. The control range may be increased by factors of 2 simply by adding more dividing circuits to the input and an equivalent number of frequency multiplying monostables to the output. Thus, in FIG. 3, a possible variation of the control range of the basic voltage controlled phase shifter is shown. A control range of 720° is achieved by means of adding to a shifter circuit with 360° control range, an an additional monostable multivibrator at the output.

While the invention has been particularly shown and described with reference to a preferred embodiment thereof, it will be understood by those skilled in the art that various changes in form and details may be made therein without departing from the spirit and scope of the invention.

I claim:

1. A voltage controlled phase shifter comprising:

a. a source of clock pulses;

b. a first differentiating circuit;

c. a frequency divider connected between said source and said first differentiating circuit to reduce the frequency of said clock pulses by one-half;

d. first gating means responsive to one of the differentiated pulses from said first differentiating circuit;

e. second gating means responsive to the other of the differentiated pulses from said first differentiating circuit;

f. a first multivibrator responsive to the pulses passed by said first gating means;

g. a second multivibrator responsive to the pulses passed by by said second gating means;

h. each of said first and second multivibrators generating a pulse corresponding in frequency to the division performed by said frequency divider;

i. control voltage source means coupled to and independent of said first and second multivibrators for shaping the multivibrator output pulses by controlling the pulse period of said multivibrators upon actuation by said gated pulses;

j. a pair of differentiator means one coupled to the output of each of said multivibrators;

k. OR gate means responsive to the output of said differentiator means for combining the signals thereof; and l. frequency doubler means coupled to the output of said OR gate for converting said half-frequency signals to a frequency corresponding to that of said clock pulses and shifted in phase from said clock pulses in direct proportion to the value of said control voltage source.